(12) United States Patent
Nakamura

(10) Patent No.: US 7,126,098 B2
(45) Date of Patent: Oct. 24, 2006

(54) TAKING LENS HAVING FOCUS DETERMINATION OPTICAL SYSTEM

(75) Inventor: Hiroshi Nakamura, Saitama (JP)

(73) Assignee: Fujinon Corporation, Saitama (JP)

( * ) Notice: Subject to any disclaimer, the term of this patent is extended or adjusted under 35 U.S.C. 154(b) by 250 days.

(21) Appl. No.: 10/389,776

(22) Filed: Mar. 18, 2003

(65) Prior Publication Data

US 2003/0173494 A1 Sep. 18, 2003

(30) Foreign Application Priority Data

Mar. 18, 2002 (JP) ............................. 2002-074314
Dec. 6, 2002 (JP) ............................. 2002-355031

(51) Int. Cl.
G02B 7/04 (2006.01)
G02B 27/40 (2006.01)
G02B 27/16 (2006.01)

(52) U.S. Cl. .................. 250/201.2; 250/216; 348/345; 348/357; 396/121

(58) Field of Classification Search .. 250/201.2–201.8, 250/216, 208.1; 356/4.04, 4.05; 348/345, 348/357; 396/80, 83, 104, 111, 119, 121
See application file for complete search history.

(56) References Cited

U.S. PATENT DOCUMENTS 4,562,345 A 12/1985 Aoki et al. .............. 250/201.8
4,570,185 A * 2/1986 Arai et al. ................... 348/345
6,689,998 B1* 2/2004 Bremer ..................... 250/201.2
2002/0140839 A1 10/2002 Yahagi ....................... 348/345

FOREIGN PATENT DOCUMENTS

| JP | 55-76312 A | 6/1980 |
|----|------------|--------|
| JP | 62-247314 A | 10/1987 |
| JP | 7-60211 B2 | 6/1995 |
| WO | WO 02/08685 A2 | 1/2002 |

* cited by examiner

*Primary Examiner*—Thanh X. Luu
*Assistant Examiner*—Stephen Yam
(74) *Attorney, Agent, or Firm*—Birch, Stewart, Kolasch & Birch, LLP

(57) ABSTRACT

The taking lens comprises a picture-taking optical system, which allows object light to enter an image-capturing element for picture-taking of a camera, and a focus determination optical system, which splits the object light and allows the split light to enter a focus status determination image-capturing element. The taking lens includes a picture-taking optical length adjusting device, which adjusts an optical length of the picture-taking optical system, and a focus determination optical length adjusting device, which adjusts an optical length of the focus determination optical system. It is hence possible to adjust the respective optical lengths separately and facilitates adjustments at the time of shipment.

8 Claims, 10 Drawing Sheets

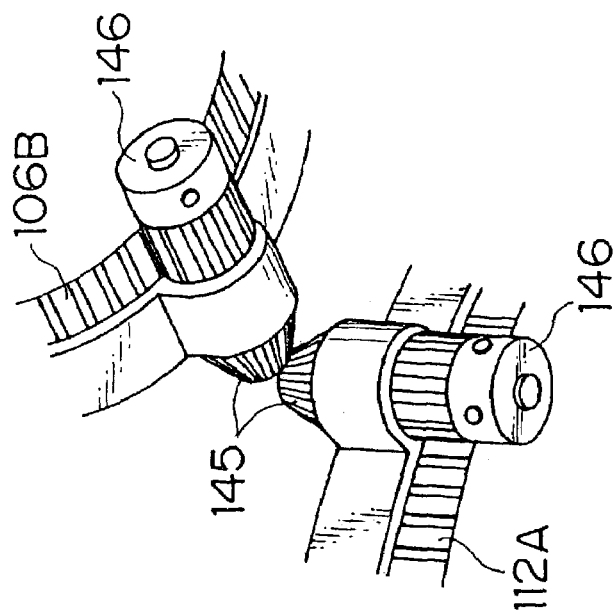
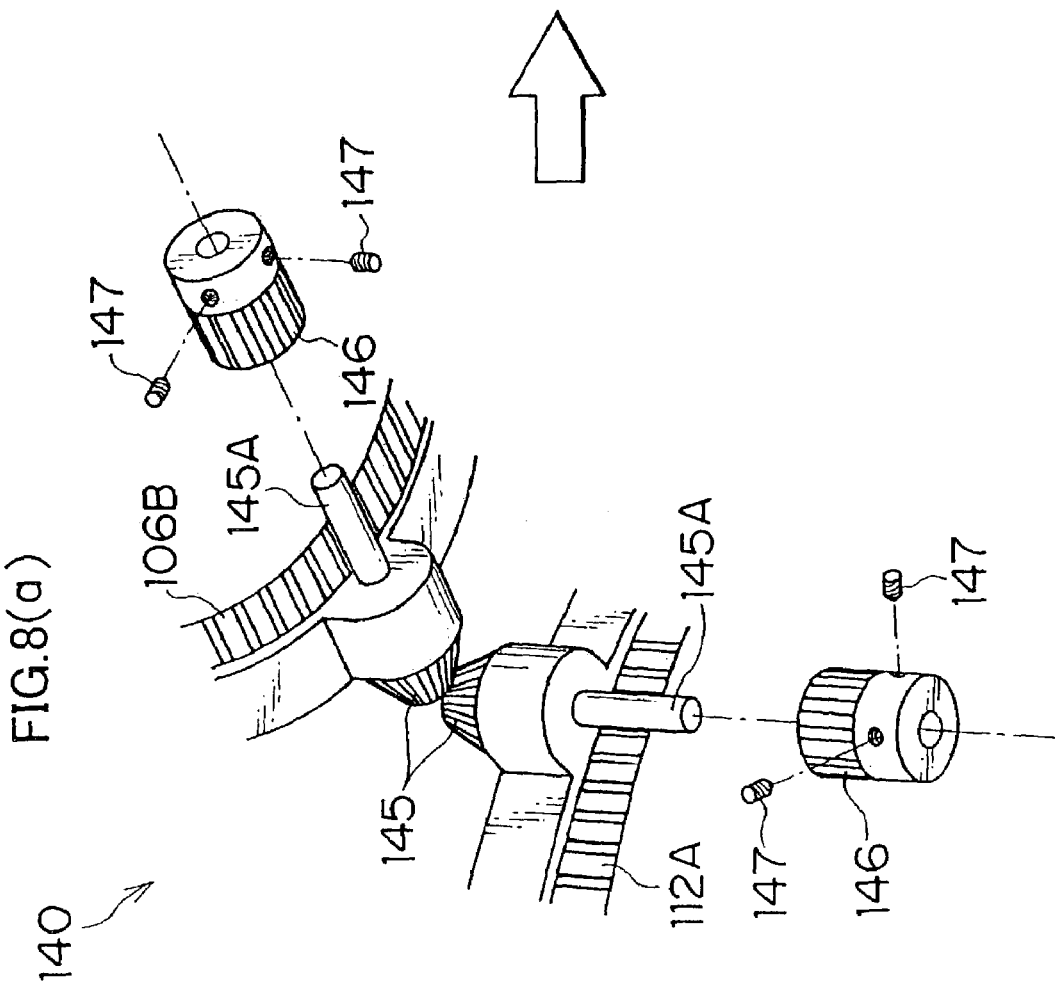

TAKING LENS HAVING FOCUS DETERMINATION OPTICAL SYSTEM

BACKGROUND OF THE INVENTION

1. Field of the Invention

The present invention relates to a taking lens, and more particularly, to a taking lens comprising a focus determination optical system which splits object light and allows the split light to enter a focus status determination image-capturing element.

2. Description of the Related Art

Various conventional methods are proposed for determining a focus status (front-focused, rear-focused, just-focused) of a taking lens using a plurality of image-capturing elements with different optical path lengths (e.g., Japanese Patent Application Publication No. 55-76312 and Japanese Patent Publication No. 7-60211). For example, for an image-capturing element for capturing video pictures (video image-capturing element), two focus status determination image-capturing elements in the same picture-taking range are placed in a position whose optical path length is longer and a position whose optical path length is shorter than that of the video image-capturing element, respectively. Then, according to high frequency components of the image signals obtained from these focus status determination image-capturing elements, focus estimates for the respective image-capturing planes of the respective focus status determination image-capturing elements are calculated and compared. Thus, according to a comparison between the focus estimates, the focus status of the image-capturing plane of the video image-capturing element is determined, that is, whether it is front-focused, rear-focused or just-focused status. Such a focus status determination method is applicable to focus determination for auto focusing, etc.

The object light for focus status determination can be obtained by splitting the object light for picture-taking that passes through the taking lens. In this case, in addition to a normal picture-taking optical system, a focus status determination optical system is constructed for the taking lens. The taking lens in such a configuration needs to place the image-capturing plane of the image-capturing element that picks up the object light for picture-taking and the image-capturing plane of the image-capturing element that picks up light for focus status determination in positions conjugate with each other. This is because if these image-capturing planes are not in positions conjugate with each other, autofocus would operate in such a way as to focus on the image-capturing element for focus status determination, with the result that the taken picture of the object is always out of focus, causing a problem of deteriorating focus accuracy.

For this reason, the product is conventionally shipped with the image-capturing plane of the image-capturing element for focus status determination adjusted to a position conjugate with the image-capturing plane of the image-capturing element for picture-taking and fixed at that position.

However, due to environmental variations in temperature and humidity, etc., the image-capturing plane of the image-capturing element for picture-taking may deviate from the position predetermined at the time of shipment. In that case, the focus position on the picture-taking side can be readjusted by adjusting tracking through a conventionally used mechanism that moves a master lens, etc., whereas the focus position on the focus status determination side remains deviated due to the lack of a readjustment mechanism.

SUMMARY OF THE INVENTION

The present invention has been implemented in view of the circumstances described above and it is an object of the present invention to provide a taking lens capable of easily adjusting the focus status determination optical system and performing accurate focus status determination.

In order to attain the above-described object, the present invention is directed to a taking lens, comprising: a picture-taking optical system which allows object light to enter an image-capturing element for picture-taking of a camera; a focus determination optical system which splits the object light and allows the split light to enter a focus status determination image-capturing element; a picture-taking optical length adjusting device which adjusts an optical length of the picture-taking optical system; and a focus determination optical length adjusting device which adjusts an optical length of the focus determination optical system.

According to the present invention, the provision of the optical length adjusting device, which adjusts the focus determination optical system for determining a focus status, in addition to the optical length adjusting device of the picture-taking optical system makes it possible to adjust the respective optical lengths separately and facilitates adjustments at the time of shipment or field readjustments when there are differences in amounts of expansion/contraction of both optical systems due to temperature variations, etc.

Preferably, the taking lens further comprises an indicating device which indicates a focus status determined by the focus determination optical system. This allows a means other than the image of the object to indicate the focus status. This improves operability compared to conventional determination of the focus status using the image of the object.

Preferably, the taking lens further comprises a coupling device which couples the picture-taking optical length adjusting device and the focus determination optical length adjusting device in such a way as to operate interlocked with each other. This allows the coupling device not only to couple the picture-taking optical length adjusting device and the focus determination optical length adjusting device of the picture-taking optical system in such a way as to operate interlocked with each other but also to decouple the two devices, adjusts both optical lengths separately in the final stage of manufacturing or only adjusts the optical length on the picture-taking side due to manufacturing errors of the camera, then couples both optical length adjusting devices by the coupling device so as to operate interlocked with each other, and can thereby make readjustments when the amounts of expansion/contraction of both optical systems due to temperature variations, etc., are the same by only the user's adjusting the optical length of the picture-taking optical system, whereby the optical length of the focus determination optical system is also adjusted in conjunction therewith.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 8(a) and 8(b) are perspective views showing another embodiment of the coupling device which couples the picture-taking optical length adjusting device and focus determination optical length adjusting device;

DETAILED DESCRIPTION OF THE PREFERRED EMBODIMENTS

With reference now to the attached drawings, embodiments of a taking lens according to the present invention will be explained in detail below.

Figure 1:
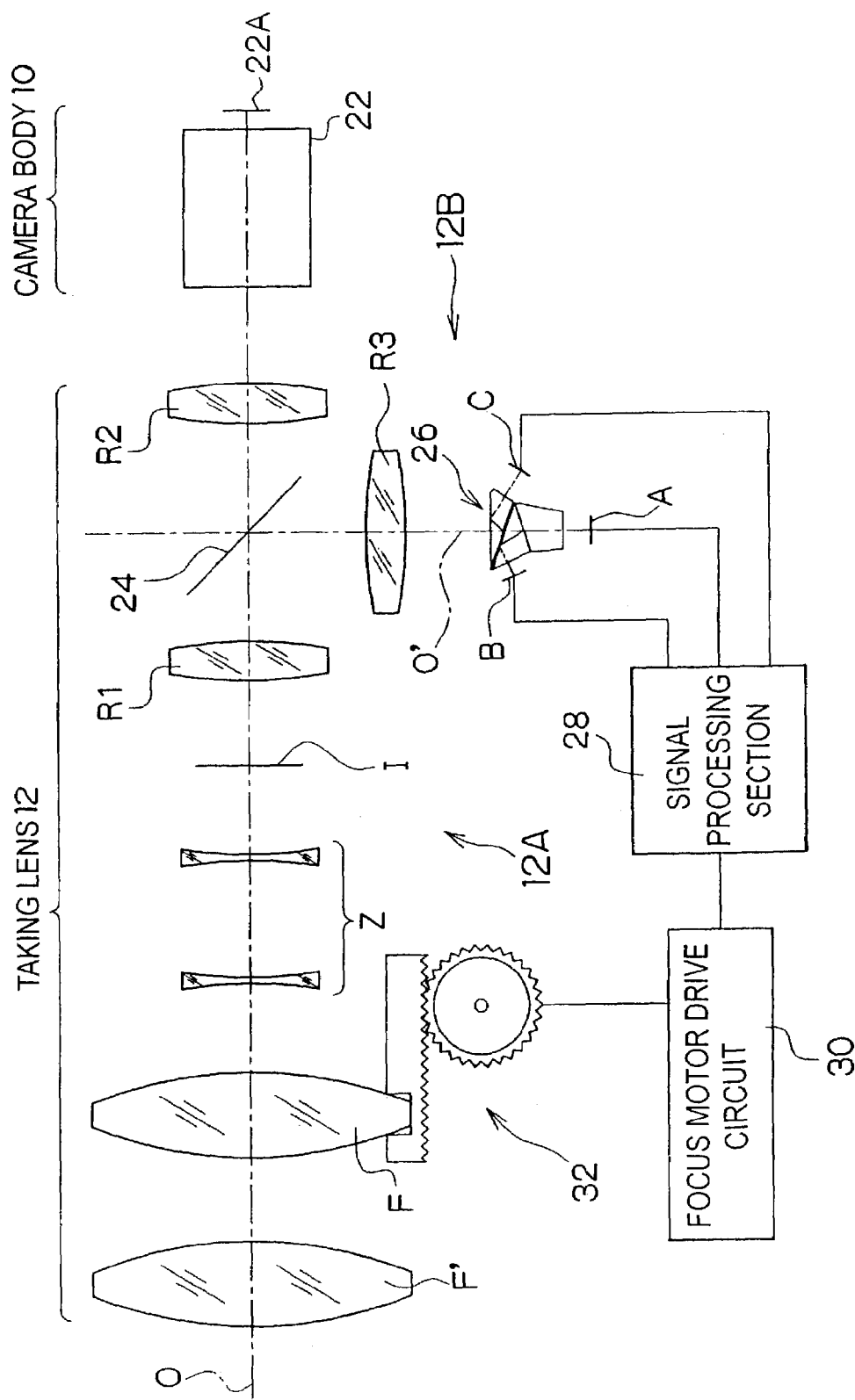
FIG. 1 is a block diagram showing a configuration of a television camera system using a taking lens according to the present invention.

FIG. 1 is a block diagram showing a configuration of a television camera system using a taking lens according to an embodiment of the present invention. The television camera system shown in FIG. 1 comprises a camera body 10 and an interchangeable taking lens 12, etc. The camera body 10 incorporates an image-capturing element (video image-capturing element) to capture video images for televising, output video signals in a predetermined format or record in a recording medium and required circuits, etc.

The taking lens 12 is detachably mounted on the front side of the camera body 10 and, as publicly known, the picture-taking optical system 12A of the taking lens 12 is constructed of, starting with the front end side, a fixed focus lens F', a movable focus lens F, a zoom lens Z made up of a variable power system and correction system, an iris I, a relay lens (relay optical system) made up of a front relay lens R1 and a rear relay lens R2, etc. The configuration of the lenses in the drawing is simplified, and a group of lenses made up of a plurality of lenses may be represented by one lens.

Furthermore, as shown in FIG. 1, a semitransparent mirror 24 is placed on the optical path of the object light between the front relay lens R1 and the rear relay lens R2 of the relay optical system, which is inclined approximately 45 degrees with respect to the optical axis O of the taking lens 12 and splits the object light (light flux) into transmitted light and reflected light.

Of the object light incident from the front end side of the taking lens 12, the transmitted light that has passed through the semitransparent mirror 24, that is, the video object light goes out of the back end side of the taking lens 12 and enters the image-capturing section 22 of the camera body 10. The semitransparent mirror 24 can also be shaped like a semitransparent prism and is not limited to this configuration if it is at least a light-splitting device. The configuration of the image-capturing section 22 will be omitted, but the object light incident upon the image-capturing section 22 is separated into three colors, red, green and blue by, for example, a color separation optical system, and the three-color lights enter into image-capturing planes of their respective image-capturing elements (video image-capturing elements) for the three colors. This allows televising color video images to be taken. A focus plane 22A is shown on the optical axis O of the taking lens 12 at a position, which is optically equivalent to the position of the image-capturing plane of each video image-capturing element.

On the other hand, the light reflected by the semitransparent mirror 24, that is, the object light for focus status determination is led to an image-capturing section 26 for focus status determination along an optical axis O' substantially perpendicular to the optical axis O of the taking lens 12 through the focus determination optical system 12B. The object light is substantially parallel light between the front relay lens R1 and the rear relay lens R2, and the object light reflected by the semitransparent mirror 24 passes through a relay lens R3 for focusing light having nature similar to that of the rear relay lens R2 and enters the focus status determination image-capturing section 26. Hereinafter, when the optical axis O and the optical axis O' are particularly distinguished in explanations, the optical axis O is referred to as the optical axis O of the picture-taking optical system and the optical axis O' is referred to as the optical axis O' of the focus determination optical system.

Figure 2:
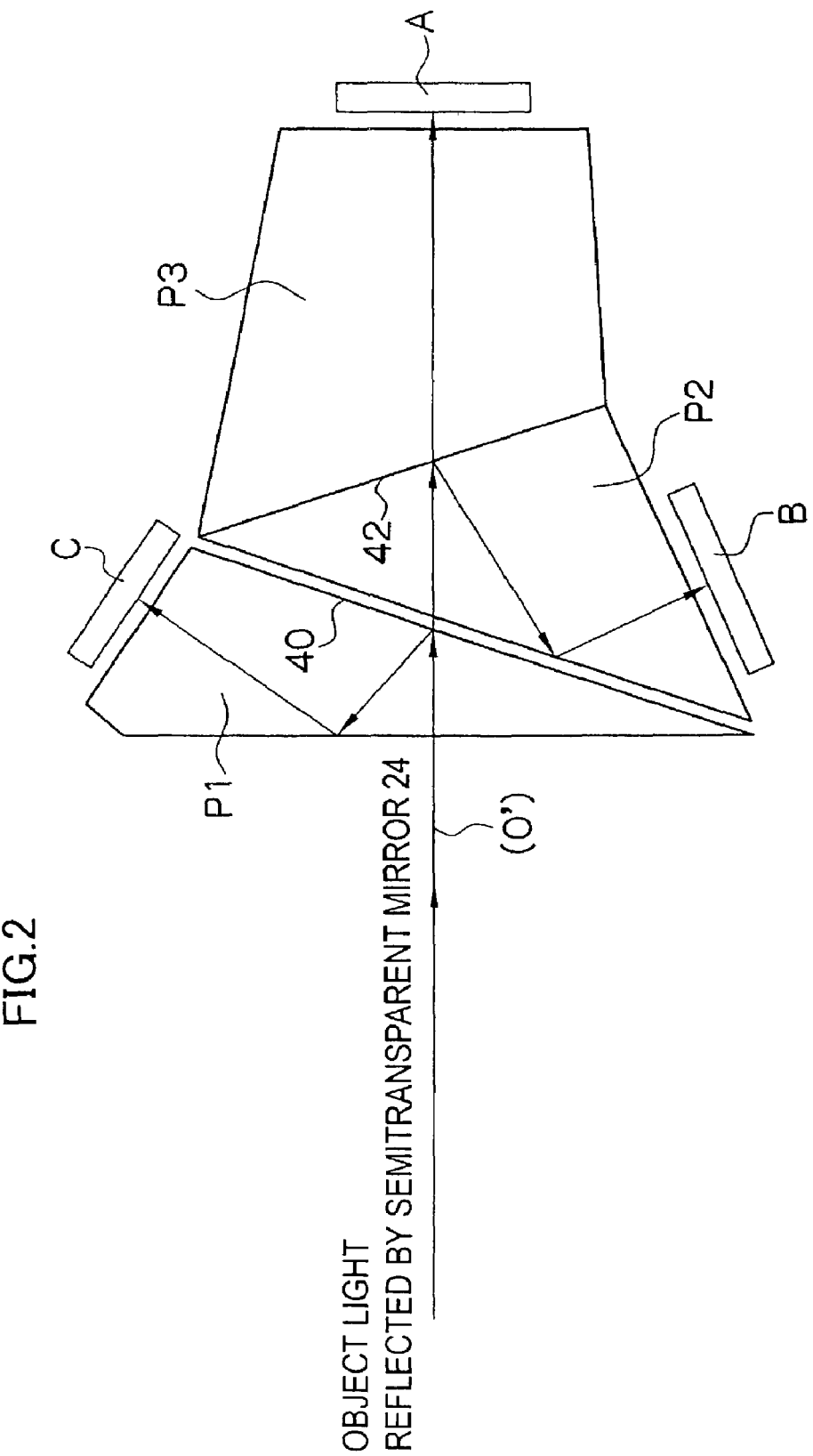
FIG. 2 is a block diagram showing a configuration of a focus status determination image capturing section.

FIG. 2 is a block diagram showing a configuration of the image-capturing section 26. As shown in FIG. 2, the image-capturing section 26 is constructed of three prisms P1, P2 and P3 making up the light splitting optical system, and three focus status determination image-capturing elements (two-dimensional charge-coupled devises (CCDs)) A, B and C. As described above, the object light that is reflected by the semitransparent mirror 24 and propagates along the optical axis O' enters the first prism P1, is then split into reflected light and transmitted light by a semitransparent mirror plane 40 of the first prism P1. The reflected light thereof enters the image-capturing plane of the image-capturing element C.

On the other hand, the light transmitted through the semitransparent mirror plane 40 enters the second prism P2 and is split into reflected light and transmitted light by a semitransparent mirror plane 42 of the second prism P2. The reflected light thereof enters the image-capturing element B. The light transmitted through the semitransparent mirror plane 42 passes through the third prism P3 and enters the image-capturing element A. The object light is split by the semitransparent mirror plane 40 of the first prism P1 and the semitransparent mirror plane 42 of the second prism P2 so that the amounts of the object light incident upon the image-capturing elements A, B and C equal. The light splitting optical system that splits the object light into image-capturing elements A, B and C is not limited to the above-described configuration using the prisms P1 to P3. The focus status determination image-capturing elements A, B and C in this embodiment can be CCDs for capturing monochrome images.

Figure 3:
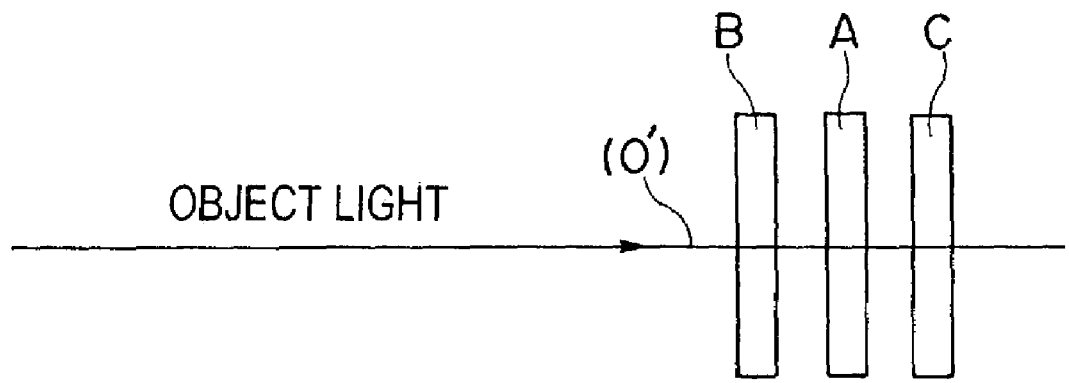
FIG. 3 illustrates focus status determination image-capturing elements A, B and C on the same optical axis.

When the optical axes of the object light incident upon the image-capturing elements A, B and C (i.e., optical axes of image-capturing elements) are shown on the same straight line as in FIG. 3, for the object light incident upon the image-capturing elements A, B and C, the optical path length of the image-capturing element B is the shortest, the optical path length of the image-capturing element C is the longest and the optical path length of the image-capturing element A is intermediate between the optical path lengths of the image-capturing elements B and C. That is, the image-capturing planes of the image-capturing elements B and C are parallelly placed before and after the image-capturing plane of the image-capturing element A at equidistant positions.

The image-capturing plane of the image-capturing element A is ideally conjugate with the focus plane 22A (see FIG. 1) of the camera body 10, so that the optical path length of the image-capturing plane of the image-capturing element A and the optical path length of the image-capturing plane of the video image-capturing elements of the camera body 10 are equal to each other with respect to the object light incident through the taking lens 12.

The optical system in the above-described configuration allows images of the object light incident through the taking lens 12 to be captured by the three focus status determination image-capturing elements A, B and C with different optical path lengths placed near positions conjugate with the focus plane 22A of the camera body 10.

Then, an outline of auto focus control according to focus status determination will be explained. As shown in FIG. 1, image signals captured by the three image-capturing elements A, B and C of the focus status determination image-capturing section 26 are taken in a signal processing section 28. The signal processing section 28 finds the position of the focus lens F (focus position) at which the focus status of the taking lens 12 comes into just-focus on the focus plane 22A of the camera body 10 according to high frequency components of the image signals acquired from the image-capturing elements A, B and C as will be described later.

The signal processing section 28 then outputs a control signal for instructing the focus lens F to move to the focus position to a focus motor drive circuit 30. The focus motor drive circuit 30 drives a focus motor, not shown, to move the focus lens F through a power transmission mechanism 32 made up of gears, etc. and set the focus lens F at the focus position specified by the signal processing section 28. Auto focus is controlled by performing this processing continually.

Then, focus status determination processing in the signal processing section 28 will be explained below. The images of the object taken by the image-capturing elements A, B and C are output as video signals in a predetermined format, converted to focus estimate signals, which indicate image sharpness (image contrast) and enter into a CPU in the signal processing section 28. The CPU determines the current focus status of the taking lens 12 with respect to the focus plane 22A of the camera body 10 according to the focus estimates obtained from the image-capturing elements A, B and C as described above.

Figure 4:
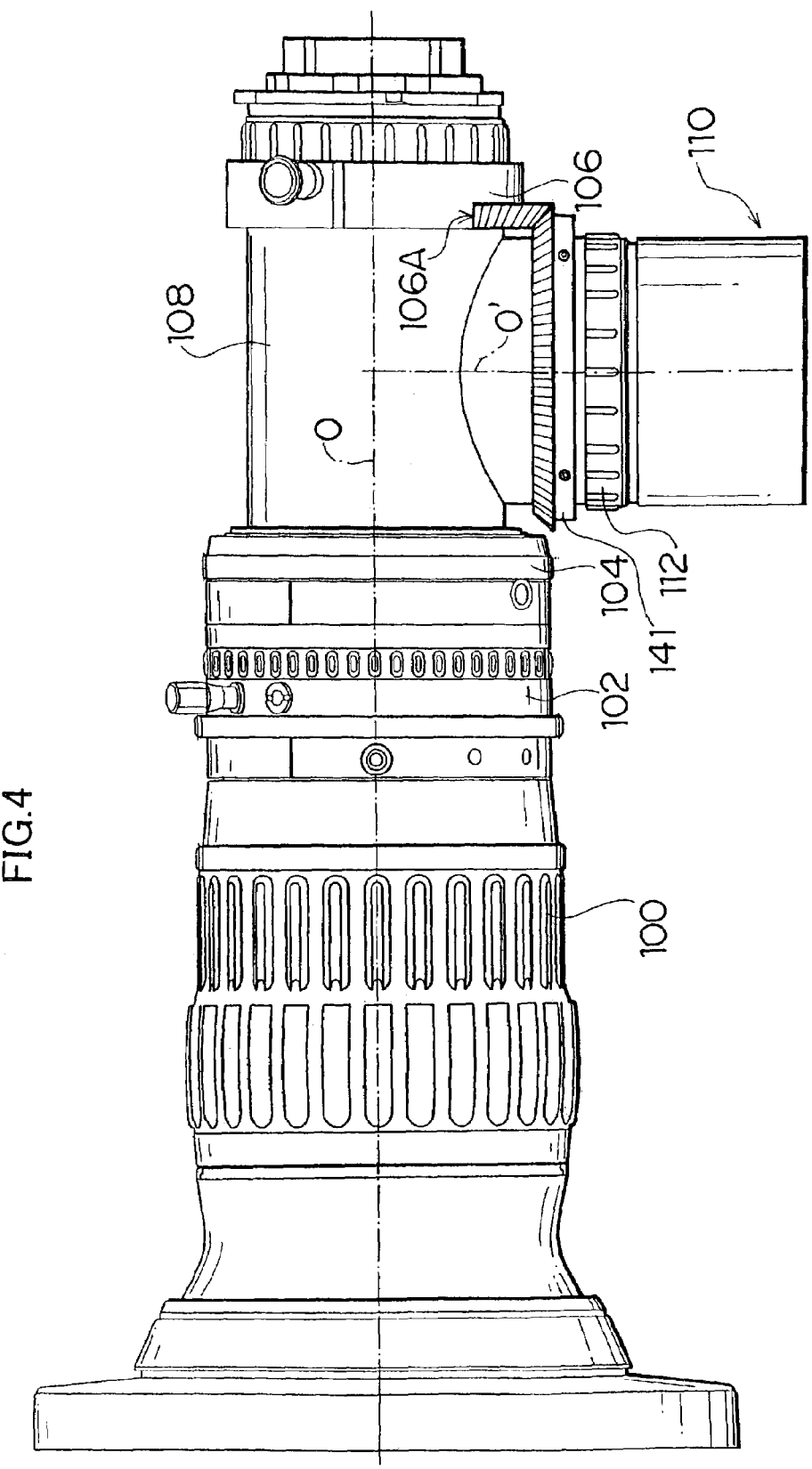
FIG. 4 is a side view showing an appearance of the lens barrel of the taking lens according to the present invention.

Then, the configuration of a lens barrel of the above-described taking lens 12 will be explained. FIG. 4 is a side view showing an appearance of the lens barrel of the taking lens 12. As shown in FIG. 4, the lens barrel of the taking lens 12 is provided, starting with the front end side, with a focus ring 100, a zoom ring 102, an iris ring 104 and a flange back adjustment ring 106, all of which are turnable. Turning the focus ring 100 causes the focus lens F in FIG. 1 to move along the optical axis O, and turning the zoom ring 102 causes the zoom lens Z in FIG. 1 to move along the optical axis O. When the iris ring 104 is turned, the iris I in FIG. 1 closes/opens, and when the flange back adjusting ring 106 that is a part of a picture-taking optical length adjusting device 12C shown in FIG. 5 is turned, the rear relay lens R2 in FIG. 1 moves along the optical axis O.

Furthermore, a lens barrel 108 between the iris ring 104 and the flange back adjustment ring 106 comprises a focus status determination lens barrel 110 along the optical axis O' of the focus status determination optical system, which is perpendicular to the optical axis O of the picture-taking optical system. This focus status determination lens barrel 110 comprises an operation ring 112 turnable to adjust the optical path length of the object light for focus status determination to the image-capturing planes of the respective image-capturing elements A, B and C.

That is, turning the operation ring 112 allows the image-capturing plane of the focus status determination image-capturing element A to be positioned accurately at a position conjugate with the focus plane 22A of the camera body 10 shown in FIG. 1. The focus status determination lens barrel 110 in the present embodiment is downwardly placed when the taking lens 12 are mounted in the camera body 10, but can be placed in any direction.

Figure 5:
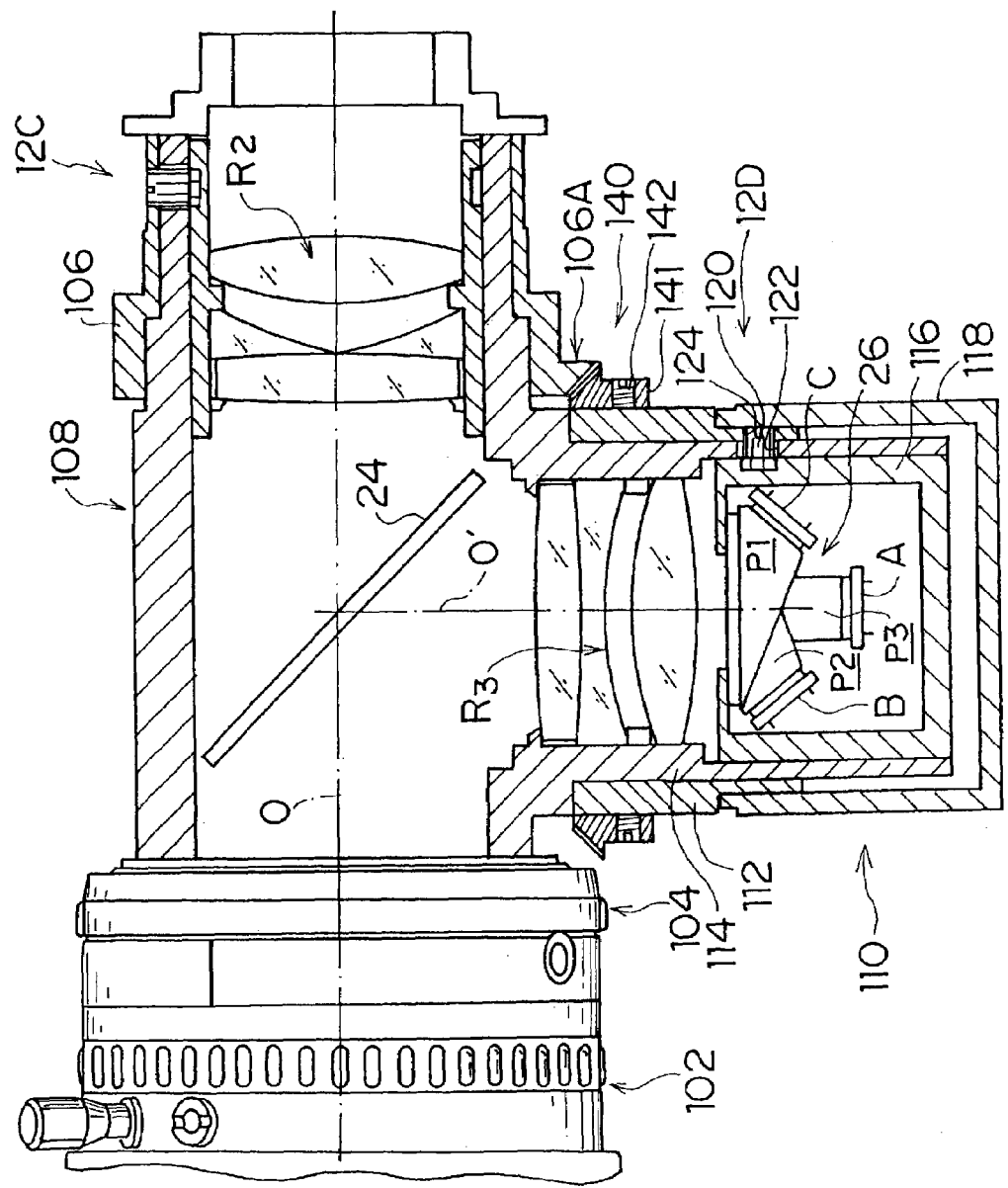
FIG. 5 is an enlarged view of key components showing a configuration of the focus status determination lens barrel.

FIG. 5 is an enlarged sectional view of key components showing a configuration of the picture-taking optical length adjusting device 12C and the focus status determination lens barrel 110. As shown in FIG. 5, the rear relay lens (group) R2 shown in FIG. 1 is placed at the rear end of the picture-taking optical system 12A (see FIG. 1) along the optical axis O, and the semitransparent mirror 24 is placed in front thereof. A fixed cylinder 114 protrudes along the optical axis O' of the focus status determination lens barrel 110 forming one body with the lens barrel 108 in which the semitransparent mirror 24 is placed.

The focus determination optical system 12B (see FIG. 1) is built in the fixed cylinder 114. The relay lens (group) R3 in FIG. 1 that forms an image of the object light for focus status determination reflected by the semitransparent mirror 24 is fixed to the base of the fixed cylinder 114, and the prisms P1 to P3 shown in FIGS. 1 and 2 and the focus status determination image-capturing section 26 made up of the image-capturing elements A to C are supported inside a frame 116 and placed at the end of the cylinder 114 in such a way as to be movable along the optical axis O'.

On the other hand, a focus determination optical length adjusting device 12D is incorporated into the fixed cylinder 114. The above-described operation ring 112 is turnably fitted on the fixed cylinder 114, and an external cylinder 118 is attached in such a way as to cover a part of the external of the operation ring 112 and the end of the fixed cylinder 114. The external cylinder 118 is fixed to the fixed cylinder 114 using screws (not shown), etc.

Figure 6:
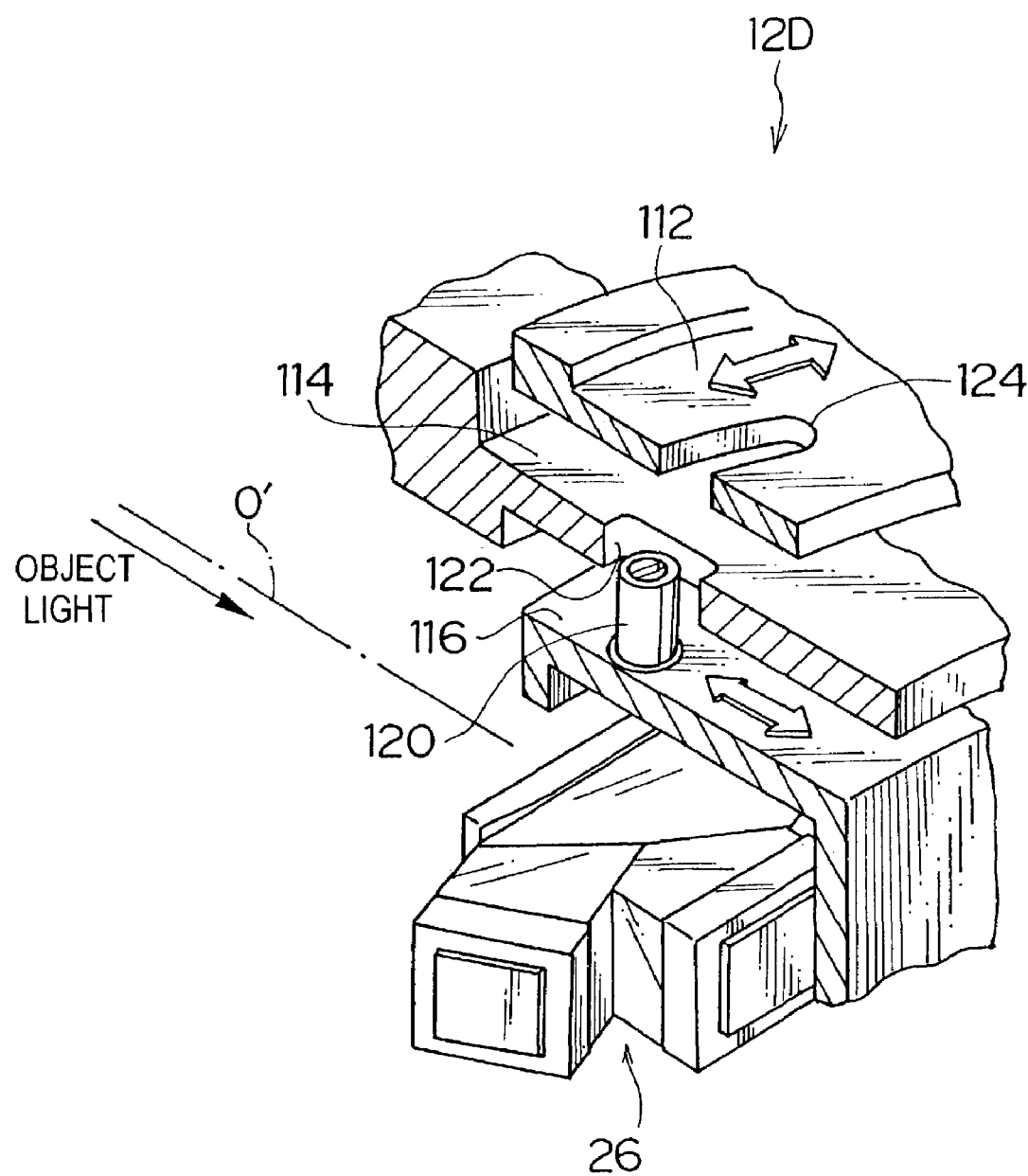
FIG. 6 is an exploded perspective view showing the configuration of the focus determination optical length adjusting means.

FIG. 6 is an exploded perspective view of the focus determination optical length adjusting device 12D. As shown in FIG. 6, in the focus determination optical length adjusting device 12D, a pin 120 is provided on the external surface of the frame 116, which supports the image-capturing section 26, and a straight groove 122 along the optical axis O', which allows the pin 120 to pass through and guides the pin 120 along the optical axis O', is formed in the fixed cylinder 114. Furthermore, a cam groove 124 is formed in the operation ring 112, which allows the pin 120 to pass through and moves the pin 120 along the optical axis O' as the operation ring 112 turns.

When the operation ring 112 is turned, the position at which the cum groove 124 intersects with the straight groove 112 moves along the optical axis O', and the pin 120 moves along the optical axis O' together. This causes the image-capturing section 26 to move along the optical axis O' together with the frame 116. Since the position of the image-capturing section 26 is thus adjustable along the optical axis O', it is possible to adjust the image-capturing plane of the image-capturing element A of the image-capturing section 26 exactly to a position conjugate with the focus plane 22 of the camera body 10.

The picture-taking optical length adjusting device 12C of the picture-taking optical system 12A is also constructed of mechanical parts having structures similar to the structures shown in FIG. 6.

As shown in FIGS. 4 and 5, a bevel gear section 106A is formed on a part of the outer surface of the flange back adjusting ring 106. Furthermore, a bevel gear 141 is built in the outer surface of the operation ring 112 in such a way as to be slidable along the optical axis O' to allow the bevel gear 141 to slide and fixed by means of screws 142 at a position to engage with the bevel gear section 106A of the flange back adjusting ring 106. The bevel gear section 106A formed on the outer surface of the flange back adjusting ring 106 and the bevel gear 141 built in the outer surface of the operation ring 112 form a coupling device 140, which couples the picture-taking optical length adjusting device 12C and the focus determination optical length adjusting device 12D in such a way as to operate interlocked with each other. Loosening the screws 142 to release the engagement of the bevel gear 141 with the bevel gear section 106A makes it possible to decouple the flange back adjusting ring 106 and the operation ring 112.

Figure 7:
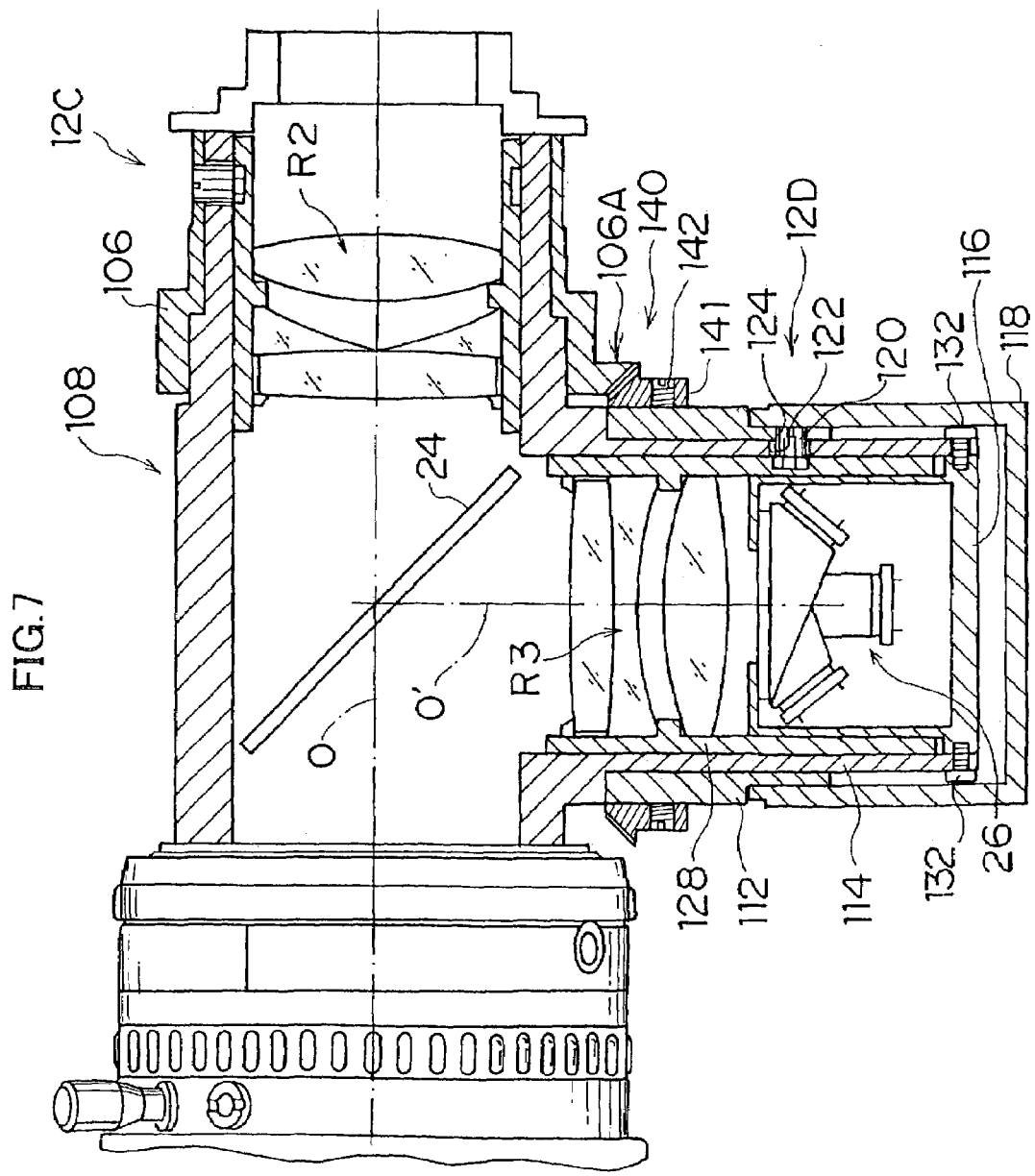
FIG. 7 is an enlarged cross-sectional view showing a configuration of another embodiment of the focus status determination lens barrel.

FIG. 7 shows a cross-sectional view, which is the equivalent of FIG. 5 with the same external appearance, in the case where the position of the relay lens R3 is made adjustable instead of adjusting the position of the image-capturing section 26, and it is possible to attain the same effect as that of adjusting the position of the image-capturing section 26 by adjusting the image-forming position of the object light for focus status determination. The members having operations identical or similar to those in FIG. 5 are assigned the same reference numerals and explanations will be partially omitted.

As shown in FIG. 7, the relay lens R3 is supported by a frame 128 and placed in such a way as to be movable inside the fixed cylinder 114 along the optical axis O'. On the other hand, the frame 116 supporting the image-capturing section 26 is fixed to a predetermined position in the fixed cylinder 114 by means of screws 132. In FIG. 7, the pin 120 attached to the frame 116 of the image-capturing section 26 is attached to a frame 128 of the relay lens R3 in this embodiment. Therefore, when the operation ring 112 is rotated, the pin 120 moves along the optical axis O' along the straight groove 122 of the fixed cylinder 114 as the cam groove 124 of the operation ring 112 moves, so that the relay lens R3 moves along the optical axis O' together with the frame 128.

Here, the above-described operation ring 112 can also be placed at the end of the focus status determination barrel section 110, not at the intermediate position of the focus status determination barrel section 110 as described above.

FIGS. 8(a) and 8(b) are perspective views showing another embodiment of the coupling device 140, which couples the picture-taking optical length adjusting device 12C and the focus determination optical length adjusting device 12D. FIG. 8(a) shows the coupling device 140 in the process of assembly, and FIG. 8(b) shows the assembled coupling device 140. In this embodiment, as shown in FIG. 8(b), the barrel section of the picture-taking optical system 12A and the fixed cylinder 114 of the focus determination optical system 12B are provided with a pair of small bevel gears 145, which are engaged with each other. Furthermore, shafts 145A of the small bevel gears 145 are inserted to small spur gears 146, which are fixed by screws 147. One of these small spur gears 146 engages with a large spur gear 106B formed around the external of the flange back adjusting ring 106, and the other spur gear 146 engages with a large spur gear 112A formed around the external of the operation ring 112, so that the picture-taking optical length adjusting device 12C and the focus determination optical length adjusting device 12D are coupled to each other in such a way as to operate interlocked with each other.

In this embodiment, removing one or both of the two small spur gears 146 provides a state shown in FIG. 8(a) in which the picture-taking optical length adjusting device 12C and the focus determination optical length adjusting device 12D are decoupled.

Figure 9:
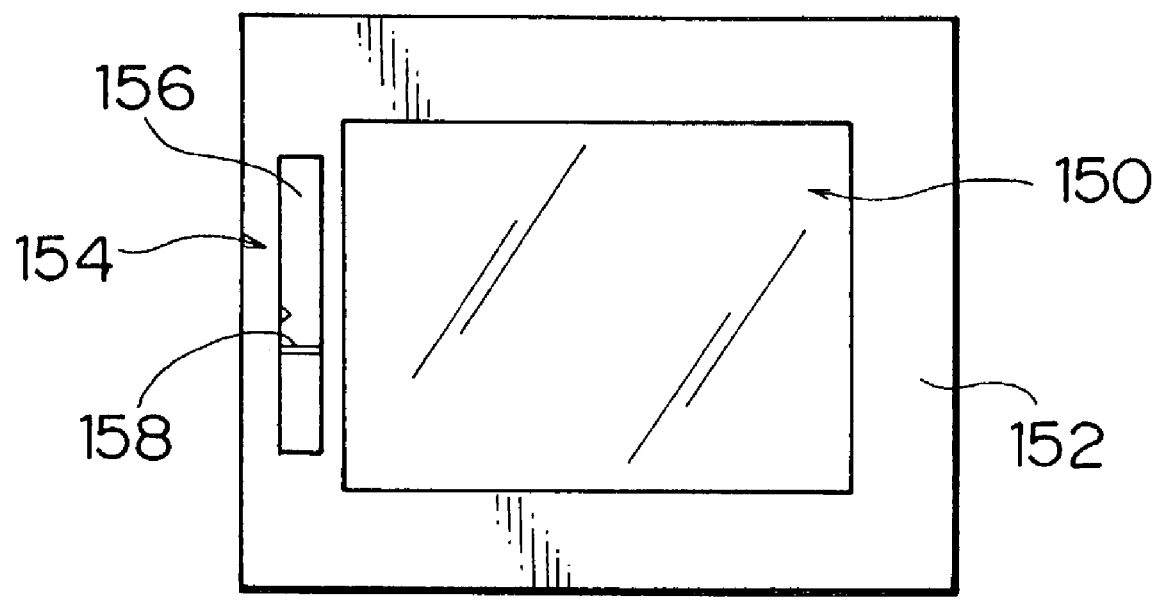
FIG. 9 illustrates an example of a display that displays a focus status.

Then, an example of the procedure for optical adjustment of the focus status determination optical system 12B constructed in the above-described focus status determination lens barrel 110 will be explained. First, instead of using the information of a focus status determined at the signal processing section 28 in FIG. 1 for auto focus control, the information is displayed on a predetermined display. For example, as shown in FIG. 9, a display 154 is placed in a frame section 152 of a view finder 150, which shows a picture taken by the video image-capturing element of the camera body 10, and the display 154 displays the focus status determined by the signal processing section 28. The display 154 comprises an oblong indicator 156 to display a horizontal bar 158, and a just-focused status is indicated when the horizontal bar 158 is in the middle of the indicator, and a front-focused or rear-focused status is indicated when the horizontal bar 158 is displaced above or below the center. The greater the displacement of the horizontal bar 158 from the center is, the greater the amount of shift from the just-focused status is.

Then, when a picture of an object is taken, the focus ring 100 of the taking lens 12 is manually operated so that the object comes into focus. Whether the object is in focus or not is determined according to the picture captured by the video image-capturing element. Then, the operation ring 112 is turned so that the focus status display indicates the just-focused status. This allows the image-capturing plane of the focus status determination image-capturing element A to be adjusted to a position conjugate with the image-capturing plane of the video image-capturing element (the focus plane 22A of the camera body 10).

In this case, the screws 142 of the bevel gear 141 of the coupling device 140 for coupling the flange back adjusting ring 106 and operation ring 112 are loosened so that the engagement between the bevel gear 141 and the bevel gear section 106A of the flange back adjusting ring 106 is released, and the above-described adjustment is performed. After the adjustment, the bevel gear 141 is engaged with the bevel gear section 106A again and fixed by the screws 142.

Thus, in the adjustment stage of the taking lens 12 before shipment, the screws 142 of the bevel gear 141 of the coupling device 140 for coupling the picture-taking optical length adjusting device 12C and the focus determination optical length adjusting device 12D are loosened so that the interlocking state is released, and the respective optical length adjusting devices are adjusted separately. After the adjustment, according to the situation of the site or at the user's request, the interlocking state may remain released or the coupling device 140 may be changed to the interlocking state and the product may be shipped with the picture-taking optical length adjusting device 12C and the focus determination optical length adjusting device 12D coupled in such a way as to operate interlocked with each other.

Figure 10:
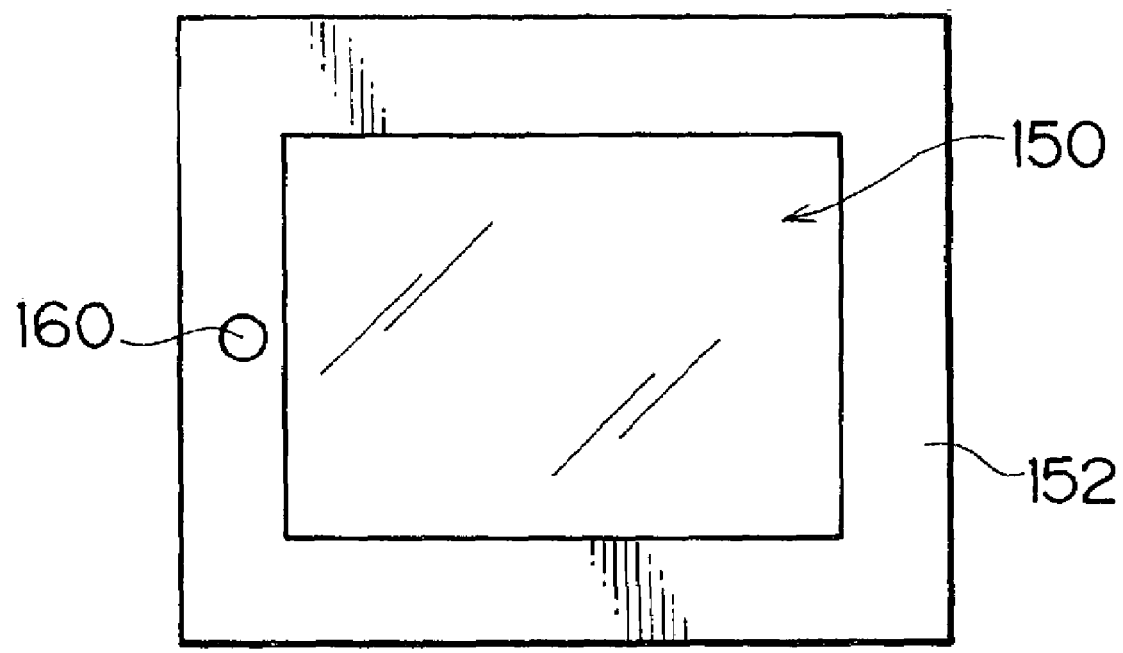
FIG. 10 shows another example of the display device which displays a focus status.

Then, another mode of the display device which displays the focus status determined by the focus determination optical system 12B will be explained according to FIG. 10. A light-emitting diode (LED) is mounted as a display device 160 on a frame section 152 of the view finder 150, on which a picture taken by the image-capturing element for picture-taking of the camera 10 is displayed, and the focus status determined by the signal processing section 28 is indicated by blinking of this LED.

Various configurations can be adopted as the method of displaying the focus status such as 1) configuration of turning on the LED only in a just-focused state, 2) configuration of distinguishing the focus status by keeping the LED constantly turned on in a just-focused state, blinking the LED at short intervals in a front-focus status and blinking the LED at long intervals in a rear-focus status, 3) configuration of providing three LEDs with different colors to distinguish the front-focus, the rear-focus and the just-focused states and turning on the corresponding one.

It is also possible to provide a device which demonstrates the same function as that of the display device 160, for example, a speaker, etc., for informing the focus status by sound instead of the display device 160. Various configurations can be adopted as the method of informing the focus status by sound such as 1) configuration of producing a signal tone only in a just-focused state, 2) configuration of distinguishing the focus status by producing a signal tone of a predetermined frequency in a just-focused state, producing a signal tone of a higher frequency in a front-focus status and producing a signal tone of a lower frequency in a rear-focus status.

The embodiments of the taking lens according to the present invention have been explained so far, but the present invention is not limited to the above-described embodiments and can be implemented in various other modes.

For example, the above-described embodiment adopt the configuration including the coupling device 140, which couples the picture-taking optical length adjusting device 12C and the focus determination optical length adjusting device 12D in such a way as to operate interlocked with each other, but it is also possible to adopt a configuration without this coupling device 140. This is because even such a taking lens can attain unprecedented notable effects. For example, it is possible to adopt a configuration with a coupling device for a high-end model and adopt another configuration without the coupling device for a low-price specification of the same model.

Furthermore, the above-described embodiments adopt the configuration using a gear structure employing bevel gears for the coupling device 140, which couples the picture-taking optical length adjusting device 12C and the focus determination optical length adjusting device 12D, but the present invention is not limited to this and can also use various mechanisms using a friction transmission mechanism, etc.

Furthermore, the above-described embodiments have described the case where the determined focus status is applied to autofocus, but the present invention is not limited to this and the determined focus status can also be used for other purposes, for example, to display a focus status.

As described above, the present invention provides the optical length adjusting device of the focus determination optical system in addition to the optical length adjusting device of the picture-taking optical system, and it is thereby possible to adjust respective optical lengths separately and to thus facilitate adjustments at the time of shipment or field readjustments when there are differences in amounts of expansion/contraction of both optical systems due to temperature variations, etc.

The present invention provides a means to indicate a focus status other than the image of the object. This improves operability compared to the conventional way of determining a focus status using the image of the object.

The present invention allows the coupling device not only to couple the optical length adjusting device of the picture-taking optical system and the optical length adjusting device of the focus determination optical system in such a way as to operate interlocked with each other but also to decouple the two devices, adjusts both optical lengths separately in the final stage of manufacturing or only adjusts the optical length on the picture-taking side due to manufacturing errors of the camera, then couples both optical length adjusting devices by the coupling device in such a way as to operate interlocked with each other, and can thereby allow the user to only adjust the optical length of the picture-taking optical system to also adjust the optical length of the focus determination optical system. Therefore, it is possible to suitably handle a case where expansion or contraction occurs in the taking lens due to temperature variations.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A taking lens, comprising:
a picture-taking optical system which allows object light to enter an image-capturing element for picture-taking of a camera, the picture taking optical system including a first optical path and a first relay lens in the first optical path movable along a first optical axis and forming an image of the object light on an image-capturing plane of the image-capturing element;
a light-splitting device in the first optical path on the opposite side of the first relay lens from the image-capturing element splitting a portion of object light to a second optical path different than the first optical path;
a focus determination optical system in the second optical path including a focus status determination image-capturing element and a second relay lens movable along a second optical axis different than the first optical axis and forming an image of the object light on an image-capturing plane of the focus status detecting image-capturing element;
a picture-taking optical length adjusting device which adjusts an optical length of the picture-taking optical system by moving the first relay lens along the first optical path; and
a focus determination optical length adjusting device which adjusts an optical length of the focus detennination optical system by moving the second relay lens along the second optical path,
wherein a plurality of focus status determination image-capturing elements, each having a different optical length, are provided in the focus determination optical length adjusting device.

2. The taking lens as defined claim 1, further comprising a coupling device which couples the picture-taking optical length adjusting device and the focus determination optical length adjusting device in such a way as to operate inter-locked with each other.

3. The taking lens as defined in claim 1, further comprising an indicating device which indicates a focus status determined by the focus determination optical system.

4. The taking lens as defined claim 3, further comprising a coupling device which couples the picture-taking optical length adjusting device and the focus determination optical length adjusting device in such a way as to operate interlocked with each other.

5. A taking lens, comprising:
- a picture-taking optical system which allows object light to enter an image-capturing element for picture-taking of a camera;
- a focus determination optical system which splits the object light and allows the split light to enter a focus status determination image-capturing element, the focus determination optical system including an image capturing plane at a first angle to the split light entering the focus status determination image capturing element;
- a picture-taking optical length adjusting device which adjusts an optical length of the picture-taking optical system; and
- a focus determination optical length adjusting device which adjusts an optical length of the focus determination optical system by moving the focus status determination image-capturing element relative to the image-capturing element for picture-taking and keeps said image capturing plane at said first angle to the split light entering the focus status determination image capturing element.

6. The taking lens of claim 5 wherein said picture-taking optical length adjusting device is mechanically coupled to said focus determination optical length adjusting device.

7. The taking lens of claim 5 wherein said picture-taking optical length adjusting device is selectively mechanically coupled to said focus determination optical length adjusting device.

8. The taking lens of claim 5 wherein the optical length of said focus determination optical system is changed in response to a change in the optical length of the picture taking optical system.

* * * * *